Patented May 26, 1931

1,807,031

UNITED STATES PATENT OFFICE

WILLIS A. GIBBONS, OF GREAT NECK, NEW YORK, ASSIGNOR TO THE NAUGATUCK CHEMICAL COMPANY, OF NAUGATUCK, CONNECTICUT, A CORPORATION OF CONNECTICUT

PROCESS FOR MODIFYING VULCANIZABLE MATERIAL AND PRODUCT

No Drawing. Application filed March 11, 1927. Serial No. 174,716. REISSUED

This invention relates to a process for modifying vulcanizable material and to the product thereof, more particularly to a process for modifying the physical properties of the material and its product.

In the manufacture of rubber articles the raw rubber used comes from many sources, is obtained from the latex in various ways and is variously treated to adapt it for different uses. For instance there are plantation rubbers obtained from the latex by different coagulation methods in which all or a greater part of the soluble contents of the latex have been eliminated, wild rubbers from which a greater or less part of the soluble constituents of the latex have been removed, and all-solid-content latex rubbers obtained by the direct drying of latex. Aside from cleaning operations where necessary, the usual preliminary step is to break down the crude rubber on heated rolls, after which it may be compounded and used in plastic form or treated with organic solvents for spreading or dipping operations. Recently there has been considerable use of latex direct for spreading, dipping and similar purposes. The various rubbers as obtained from the latex vary considerably in their properties, such as break down period, ageing, elasticity, tensile strength, viscosity, softness, optimum curing time, etc., and as a result one of them may be most suitable for a certain use while another is best adapted for some other purposes. For instance, the all-solid content latex rubber has great strength, superior ageing and curing qualities and elasticity, but ordinarily requires a longer break down period than certain other rubbers. It will therefore be seen that it is often desirable to impart to one variety of crude rubber properties possessed by another while at the same time retaining certain of its own distinguishing characteristics. It is obvious that by so modifying the properties of one rubber stock it may be made to serve for a greater number of purposes, with resulting increased efficiency and economy. It has also been found that articles or materials obtained by direct deposition of rubber from latex, as by spreading or dipping, even when vulcanized are stiffer or more inflexible by reason of the greater "nerve" and toughness of such rubber, while similar articles or materials obtained from doughs or cements made of broken down rubber have greater flexibility. Due to its superiority in other respects it is desirable to employ the direct latex deposition method in the making of such articles or materials.

An object of my invention is to provide a process for modifying the physical properties of vulcanizable material by preliminary treatment of latex.

Another object is to provide a process for modifying the milling properties of crude rubber.

Still another object is to provide a process for modifying the physical properties of vulcanizable or vulcanized articles or materials, obtained by direct deposition of rubber from latex.

A further object is to increase the field of usefulness of individual crude rubbers in the rubber art.

A still further object is to provide a crude rubber having a reduced break down period.

A still further object is to provide a vulcanizable or vulcanized material, derived directly from latex, and having an increased flexibility.

The invention consists broadly in modifying the properties of vulcanizable material, particularly its physical properties, by preliminarily subjecting latex to regulated heat and pressure, with or without the assistance of chemicals, and it also consists in the product of the process.

For a detailed disclosure of the invention reference is had to the accompanying specification.

In carrying out one embodiment of the invention in the case of a vulcanizable material such as rubber, rubber latex is disposed in a closed vessel or tank in quantity sufficient almost to fill the same, and is then subjected to heat, and to pressure such as that resulting from the heating. This heating may be accomplished in any suitable manner, as by using a steam jacketed tank. The heat may be applied in gradually increasing degree for a definite period, or after such gradual heating to a predetermined temperature the heat may also be maintained at such temperature for a greater or less time. As one example of the change in physical properties resulting from the treatment, the break down time of preliminarily treated all-solid content latex rubber as compared with that of ordinary all-solid content latex rubber and pale crepe is shown in the following data taken from a series of tests:

| Heating conditions for preliminarily treated all-solids content latex rubber | Breakdown time | Power consumption |
|---|---|---|
| | Minutes | Kilowatt-hour |
| ½ hr. rise to 20# steam | 7¼ | .0958 |
| ½ hr. rise to 20# 1 hr. at 20# | 6 | .0696 |
| ½ hr. rise to 20# 1 hr. at 20# | 8 | .0895 |
| ½ hr. rise to 60# | 7 | .0841 |
| ½ hr. rise to 60# ½ hr. at 60# | 6 | .0695 |
| ½ hr. rise to 60# 1 hr. at 60# | 6½ | .0722 |
| ½ hr. rise to 60# 3 hrs. at 60# | 5 | |
| Ordinary all-solids content latex rubber | 10–11 | .1300 |
| Pale crepe | 7¼ | .0977 |

The latex rubbers referred to in the above table were obtained by spray drying of the latex, but the invention is not, however, limited to rubber obtained from the latex by any particular method. It is known to sterilize latex at 212° F. under pressure. Such procedure, however, is a brief one and it will be apparent from the above table that the treatment in this case is in excess of such a treatment in order to have the desired effect upon the rubber rather than on the germs present in the latex.

In addition to the heat treatment above described the process may also include the use of desired reagents to produce various alterations in the resulting rubber. For example, the latex during the heat treatment may be subjected to the action of substances adapted to combine with or decompose proteins, as for instance, caustic alkalies; or treated with substances capable of dissolving and forming compounds with free or combined resin acids, alkalies, alkali carbonates or ammonia; or it may be subjected to the action of substances adapted to combine with the sugars present, as for example derivatives of hydroxylamins or hydrazines. The invention also includes treating latex with substances adapted to alter the properties of the rubber hydrocarbon either chemically or physically, but excluding vulcanization, as for example rubber solvents or softeners or substances adapted to oxidize rubber, such as drying oils and/or oxidizing agents. These materials may if desired be added to the latex in the form of emulsions.

The preliminarily treated latex may be used directly for such operations as dipping or spreading, and it has been found that the material or articles formed in this manner have a greatly increased flexibility, while at the same time retaining all the desirable qualities obtained by the use of untreated latex. If desired the preliminarily treated latex may be concentrated in the usual manner, and the concentrated latex used as desired with the same good results as obtained in the case of unconcentrated treated latex. The treated latex may also be converted into crude rubber by any of the standard methods, which rubber has been found to be considerably softer and to have a shorter breakdown period. The treated latex may be sprayed directly from the vessel in which it has been heated under pressure. By running the latex while still hot into the spray chamber the heat content of the latex may thus be utilized and an economy in manufacture effected. It might be supposed from previous knowledge of the characteristics of rubber that the above described treatment for increasing the softness and reducing the breakdown period of the rubber would result in a corresponding decrease in the tensile strength and deterioration in its other physical properties, but such has not been found to be the case. For instance the time of cure and the tensile strength of spray dried rubber, produced from the heat treated latex has been found to be practically the same as, and in some cases superior to, that produced from spray dried unheated latex.

It will be seen that by my invention the field of use for an individual crude rubber may be considerably enlarged by modifying its properties to adapt it for purposes for which another rubber stock may have been primarily more suitable, thus enabling rubber factories to reduce the number of different stocks required for various purposes. In particular the reduction in the breakdown period from the normal one required with a similar rubber made from untreated latex constitutes a valuable saving both in the time, labor and space required, and also in the power consumption. The increased flexibility of goods obtained by the direct deposition or rubber from the treated latex is also another valuable feature of the invention.

While the invention has been more or less specifically described it is obvious that the present disclosure will suggest numerous modifications to those skilled in the art and it is not desired to limit the invention otherwise than as set forth in the appended claims.

Having thus described my invention, what I claim and desire to protect by Letters Patent is:

1. The process of modifying the properties of vulcanizable material by preliminary treatment of latex with normal water content which process comprises heating the latex above 212° F. without evaporation of its water content for a length of time in excess of that required to sterilize against the action of bacteria.

2. The process of modifying the properties of vulcanizable material by preliminary treatment of normal latex which comprises gradually raising the temperature of the latex to a point above 212° F. and heating for a length of time in excess of that required to sterilize against the action of bacteria while contained in a closed vessel.

3. The process of modifying the properties of vulcanizable material by preliminary treatment of normal latex which comprises gradually raising the temperature of the latex to a predetermined point above 212° F. while contained in a closed vessel, and maintaining it at such point for two or more hours.

4. The process of modifying the milling properties of vulcanizable material which consists in subjecting latex of normal water content to a regulated heat and pressure at a temperature above 212° F. for 2–3 hrs. while simultaneously maintaining its water content substantially unchanged, and subsequently withdrawing water therefrom.

5. The process of modifying the milling properties of vulcanizable material which consists in subjecting normal latex to a regulated heat and pressure at a temperature above 212° F. for 2–3 hrs. while simultaneously maintaining its water content substantially unchanged, and subsequently withdrawing water from the heated latex by atomization in a heated chamber.

6. The process of modifying the properties of vulcanizable material which comprises heating normal latex above 212° F. for 2–3 hrs. without substantial change in its water content, removing part of its water content to form a concentrated latex, and subsequently removing the balance of the water after fabrication of the concentrated latex.

7. The process of modifying the physical properties of vulcanizable material by preliminary treatment of normal latex which comprises subjecting the latex without coagulation, precipitation of its solids or substantial change in its water content, to the action of chemicals under gradually increasing heat and pressure to above 212° F. for a length of time in excess of that required to sterilize against the action of bacteria.

8. The process of modifying the physical properties of vulcanizable material by preliminary treatment of normal latex which comprises subjecting the latex without coagulation, precipitation of its solids or substantial change in its water content, to the action of basic materials under gradually increasing heat and pressure to above 212° F. for 2–3 hrs.

9. The process of modifying the physical properties of vulcanizable material by preliminary treatment of normal latex which comprises subjecting the latex without coagulation, precipitation of its solids or substantial change in its water content, to the action of alkali under gradually increasing heat and pressure to above 212° F. for 2 or more hours.

10. As a new article of manufacture, a rubber product obtained from modifying normal latex by heat and pressure at a temperature above 212° F. for 2 or more hours without substantial change in the water content thereof.

11. As a new article of manufacture, a vulcanizable rubber product obtained from modifying normal latex by heat and pressure at a temperature above 212° F. for 2–3 hrs. without substantial change in the water content thereof, said product having increased softness and reduced viscosity.

12. As a new article of manufacture, a vulcanizable rubber product obtained from modifying normal latex by the action of chemicals and heat and pressure at a temperature above 212° F. for 2–3 hrs., said product having increased softness and reduced viscosity.

13. As a new article of manufacture, a modified crude rubber obtained from heating normal latex under heat and pressure at a temperature above 212° F. for 2 or more hours and having a sub-normal breakdown period and increased flexibility.

Signed at New York, county and State of New York, this 8th day of March, 1927.

WILLIS A. GIBBONS.